US010025714B2

(12) United States Patent
Han et al.

(10) Patent No.: US 10,025,714 B2
(45) Date of Patent: Jul. 17, 2018

(54) MEMORY TYPE RANGE REGISTER WITH WRITE-BACK CACHE STRATEGY FOR NVDIMM MEMORY LOCATIONS

(71) Applicant: SUPER MICRO COMPUTER, INC., San Jose, CA (US)

(72) Inventors: Donald Han, San Jose, CA (US); John Chen, San Jose, CA (US); Jason Chang, San Jose, CA (US)

(73) Assignee: Super Micro Computer, Inc., San Jose, CA (US)

( * ) Notice: Subject to any disclaimer, the term of this patent is extended or adjusted under 35 U.S.C. 154(b) by 75 days.

(21) Appl. No.: 15/282,945

(22) Filed: Sep. 30, 2016

(65) Prior Publication Data
US 2018/0095879 A1 Apr. 5, 2018

(51) Int. Cl.
*G06F 12/0804* (2016.01)
*G06F 3/06* (2006.01)

(52) U.S. Cl.
CPC ........ *G06F 12/0804* (2013.01); *G06F 3/0619* (2013.01); *G06F 3/0647* (2013.01); *G06F 3/0679* (2013.01); *G06F 2212/1032* (2013.01); *G06F 2212/202* (2013.01); *G06F 2212/205* (2013.01)

(58) Field of Classification Search
None
See application file for complete search history.

(56) References Cited

U.S. PATENT DOCUMENTS

| | | | | |
|---|---|---|---|---|
| 5,467,286 A * | 11/1995 | Pyle | ................ | G01R 19/25 702/62 |
| 5,958,045 A * | 9/1999 | Pickett | ................ | G06F 9/30043 711/118 |
| 8,677,037 B1 * | 3/2014 | Karamcheti | ......... | G06F 13/1657 710/62 |
| 9,430,386 B2 * | 8/2016 | Bruce | ................. | G06F 12/0811 |
| 9,529,543 B1 * | 12/2016 | Chinnakkonda Vidyapoornachary | .. | G11C 5/04 |
| 9,563,565 B2 * | 2/2017 | Mirichigni | | |
| 9,645,829 B2 * | 5/2017 | Jayakumar | ............ | G06F 9/4401 |
| 9,710,343 B2 * | 7/2017 | Petersen | ............. | G06F 11/2015 |
| 9,727,112 B1 * | 8/2017 | Karamcheti | .............. | G06F 1/30 |

(Continued)

OTHER PUBLICATIONS

Memory type range register—from Wikipedia, the free encyclopedia, 3 sheets [retrieved on Sep. 13, 2016], retrieved from the internet: https://en.wikipedia.org/wiki/Memory_type_range_register.

(Continued)

*Primary Examiner* — Midys Rojas
*Assistant Examiner* — Khoa D Doan
(74) *Attorney, Agent, or Firm* — Okamoto & Benedicto LLP

(57) ABSTRACT

A computer system includes a dual in-line memory module (DIMM), such as a registered DIMM (RDIMM), and a non-volatile DIMM (NVDIMM). A central processing unit (CPU) of the computer system has internal cache memory locations for caching data for the DIMM and NVDIMM. A memory type range register (MTTR) of the CPU is set for write-back cache strategy for a range of memory locations in the DIMM and NVDIMM. The computer system includes a power supply that, in the event of a power failure, triggers a hardware non-maskable interrupt (NMI) and sustains power to the CPU to allow cached data to be saved to non-volatile memory locations in the NVDIMM before the computer system completely powers down.

8 Claims, 2 Drawing Sheets

(56) References Cited

U.S. PATENT DOCUMENTS

| | | | | |
|---|---|---|---|---|
| 9,740,606 B1* | 8/2017 | McKelvie | | G06F 12/0238 |
| 9,747,208 B2* | 8/2017 | Kumar | | G06F 12/0804 |
| 9,753,793 B2* | 9/2017 | Kumar | | G06F 11/073 |
| 9,767,015 B1* | 9/2017 | McKelvie | | G06F 12/0238 |
| 9,772,942 B2* | 9/2017 | Bahali | | G06F 12/0804 |
| 9,787,134 B2* | 10/2017 | Lecourtier | | H02J 9/061 |
| 9,875,036 B2* | 1/2018 | Chinnakkonda Vidyapoornachary | | G06F 3/061 |
| 2004/0103238 A1* | 5/2004 | Avraham | | G06F 11/1441 711/102 |
| 2004/0243766 A1* | 12/2004 | Lovelace | | G06F 12/0804 711/133 |
| 2005/0108494 A1* | 5/2005 | Berlin | | G06F 12/0292 711/170 |
| 2013/0103887 A1* | 4/2013 | Frey | | G06F 9/442 711/103 |
| 2014/0297919 A1* | 10/2014 | Nachimuthu | | G11C 14/009 711/102 |
| 2014/0325116 A1* | 10/2014 | McKelvie | | G06F 12/0246 711/103 |
| 2015/0279463 A1* | 10/2015 | Berke | | G11C 5/04 711/105 |
| 2015/0301126 A1* | 10/2015 | Marchand | | G06F 1/30 324/764.01 |
| 2015/0378808 A1* | 12/2015 | Kumar | | G09C 1/00 714/799 |
| 2015/0380985 A1* | 12/2015 | Lecourtier | | H02J 7/0068 713/300 |
| 2016/0011802 A1* | 1/2016 | Berke | | G06F 3/0619 711/166 |
| 2016/0118121 A1* | 4/2016 | Kelly | | G06F 13/4068 710/301 |
| 2016/0179375 A1* | 6/2016 | Kirvan | | G06F 3/0685 711/153 |
| 2017/0017402 A1* | 1/2017 | Zheng | | G06F 3/0605 |
| 2017/0168937 A1* | 6/2017 | Bahali | | G06F 12/0804 |
| 2017/0337009 A1* | 11/2017 | Fanning | | G06F 3/0644 |
| 2017/0371778 A1* | 12/2017 | McKelvie | | G06F 11/1471 |

OTHER PUBLICATIONS

Supercapacitor—from Wikipedia, the free encyclopedia, 35 sheets [retrieved on Sep. 28, 2016], retrieved from the internet: https://en.wikipedia.org/wiki/Supercapacitor.

Supermicro—Implementation of high speed storage solutions by Alan Johnson, Storage Industry Summit Realizing the Benefits of the Convergence of Storage and Memory, Jan. 20, 2015, pp. 1-24.

* cited by examiner

MEMORY TYPE RANGE REGISTER WITH WRITE-BACK CACHE STRATEGY FOR NVDIMM MEMORY LOCATIONS

BACKGROUND OF THE INVENTION

1. Field of the Invention

The present invention relates generally to computer systems.

2. Description of the Background Art

A computer system may include one or more central processing units and one or more memory modules. A memory module comprises one or more memory integrated circuits ("chips"). A memory chip may comprise volatile memory (e.g., dynamic random access memory (DRAM)), non-volatile memory (e.g., flash memory), or both. Volatile memory loses its contents when the computer system's power is interrupted. In contrast, non-volatile memory keeps its contents even in the absence of system power. Generally speaking, volatile memory is faster than non-volatile memory and is thus preferred as main memory for processes of the operating system, application programs, etc. Currently-available computer systems typically employ dual in-line memory modules (DIMMs), which comprise only volatile memory, for main memory. A registered DIMM (RDIMM) has a register between the DRAM modules and the memory controller, but is otherwise the same as a DIMM and has only volatile memory. Unlike a DIMM or RDIMM, a non-volatile DIMM (NVDIMM) comprises both volatile memory to provide fast access speeds and non-volatile memory as insurance against power failure.

A central processing unit (CPU) may have an internal cache memory for caching the contents of memory locations. Cached data may be written to corresponding memory locations (i.e., memory locations being cached) in accordance with a write-through cache strategy or write-back cache strategy. With write-through, data that are written to the cache memory are also written to the corresponding memory location at the same time. This way, the cache memory and the corresponding memory locations are always in synchronization. With write-back, data that are written to the cache memory are written to the corresponding memory location only at intervals or under certain conditions. Because an NVDIMM is meant to store critical data, NVDIMM memory locations are traditionally cached in accordance with the write-through cache strategy to ensure that the NVDIMM always has the most current data.

SUMMARY

In one embodiment, a computer system includes a DIMM, such as an RDIMM, and an NVDIMM. A CPU of the computer system has internal cache memory locations for caching data for the DIMM and NVDIMM. A memory type range register (MTTR) of the CPU is set for write-back cache strategy for a range of memory locations in the DIMM and NVDIMM. The computer system includes a power supply that, in the event of a power failure, triggers a hardware non-maskable interrupt (NMI) and sustains power to the CPU to allow cached data to be saved to non-volatile memory locations in the NVDIMM before the computer system completely powers down.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
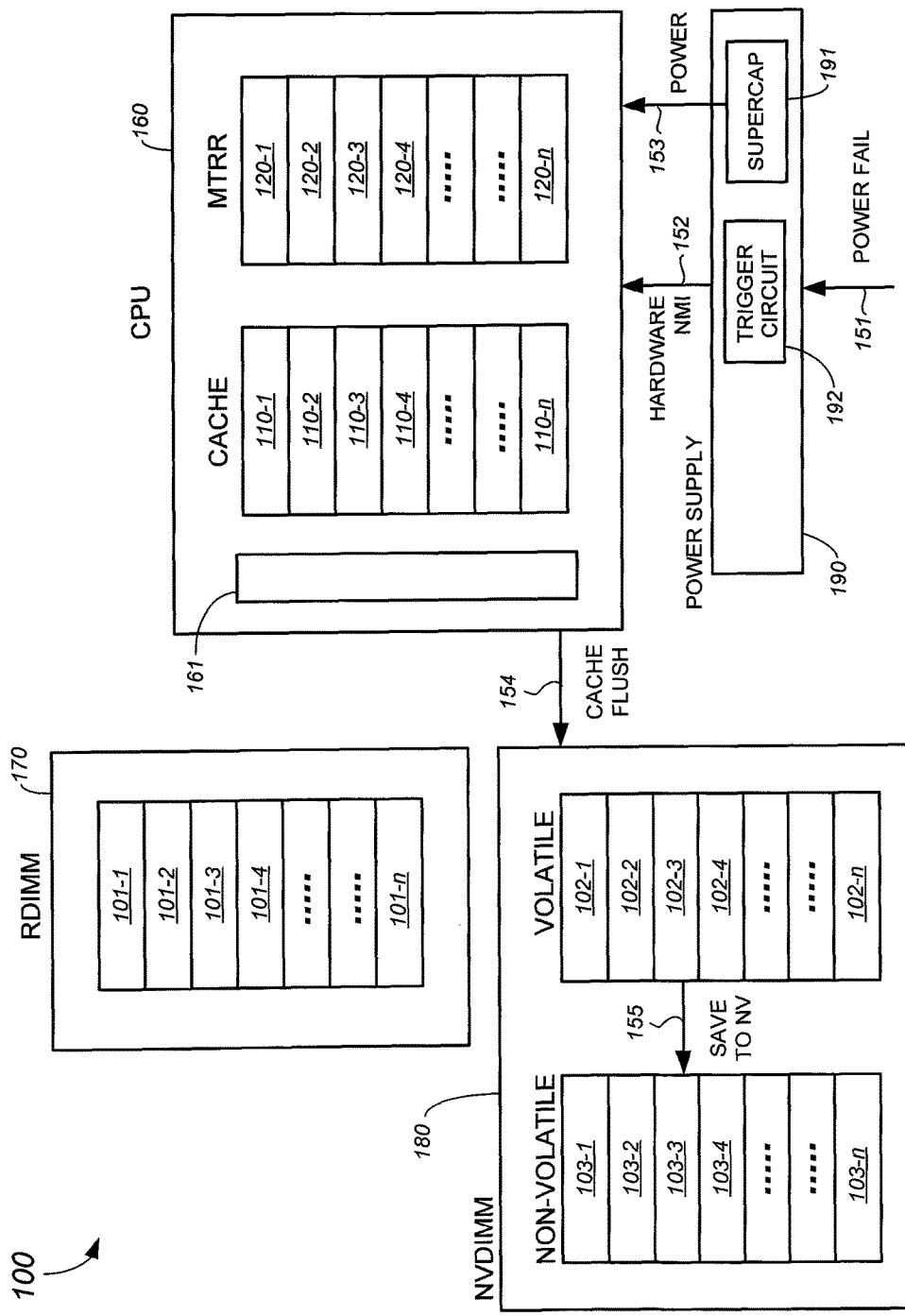
FIG. 1 is a schematic diagram of a computer system in accordance with an embodiment of the present invention.

FIG. 1 is a schematic diagram of a computer system 100 in accordance with an embodiment of the present invention. The computer system 100 may be implemented using components that are commercially-available from the INTEL Corporation, for example. More specifically, in the example of FIG. 1, a central processing unit (CPU) 160 may be an INTEL processor. In the example of FIG. 1, the computer system 100 further includes memory modules comprising one or more RDIMM 170 and one or more NVDIMM 180. Components of the computer system 100 that are not relevant to the understanding of the present invention are not shown for clarity of illustration.

In the example of FIG. 1, the RDIMM 170 has volatile memory locations 101 (i.e., 101-1, 101-2, . . . , 101-n). The NVDIMM 180 has volatile memory locations 102 (i.e., 102-1, 102-2, . . . , 102-n) and non-volatile memory locations 103 (i.e., 103-1, 103-2, . . . , 103-n). For performance reasons, because non-volatile memory is slower than volatile memory, data stored in the NVDIMM 180 are first stored in the memory locations 102. In the event of a power failure or as commanded by the CPU 160, data in the memory locations 102 are written to the memory locations 103, such as by asynchronous DRAM refresh (ADR).

In the example of FIG. 1, the CPU 160 has an internal memory controller 161 for reading and writing to the RDIMM 170 and NVDIMM 180. To minimize external bus access, the CPU 160 includes internal cache memory locations 110 (i.e., 110-1, 110-2, . . . , 110-n) for caching memory locations in the RDIMM 170 and NVDIMM 180.

In the example of FIG. 1, the CPU 160 further includes internal memory type range registers (MTRRs) 120 (i.e., 120-1, 120-2, . . . , 120-n) for setting the cache strategy for particular memory locations in the RDIMM 170 and NVDIMM 180. More particularly, the operating system (or other software module or system component), may set an MTRR 120 to indicate whether a particular range of memory locations will be cached in accordance with the write-back or write-through cache strategy. Different ranges of memory locations may have different MTRR 120 settings. For example, the MTRR 120-1 may be set for write-back to indicate that memory locations 101-1 to 101-5 in the RDIMM 170 will be cached in accordance with the write-back cache strategy, the MTRR 120-2 may be set for write-through to indicate that memory locations 102-1 to 102-9 in the NVDIMM 180 will be cached in accordance with the write-through cache strategy, the MTRR 120-3 may be set for write-back to indicate that memory locations 101-6 to 101-10 in the RDIMM 170 will be cached in accordance with the write-back cache strategy, and so on.

Setting different cache strategies for different memory locations results in fragmented MTRRs 120 and consumes many MTRRs 120, which are limited in number. Disorganized MTRRs 120 may lead to system hangs, among other problems. This problem is exacerbated by setting the MTRR 120 for the memory locations in the NVDIMM 180 for write-through, given that the MTRR 120 for memory locations in the RDIMM are set for write-back for performance reasons.

In the example of FIG. 1, power to the computer system 100 is provided by a power supply 190. In one embodiment, the power supply 190 includes a supercapacitor 191 and a non-maskable interrupt (NMI) trigger circuit 192. The NMI trigger circuit 192 may comprise an electrical circuit that detects for power fail conditions (e.g., low voltage levels, absence of AC power input) and triggers a hardware NMI in response to detecting the power fail condition. The NMI trigger circuit 192 may detect a power fail condition using a comparator circuit, and trigger a hardware NMI by asserting an NMI line/pin or other line/pin that triggers a hardware NMI on a bus of the computer system, for example. In the example of FIG. 1, the supercapacitor 191 provides a burst of power that allows the CPU 160 to remain operational for a limited time (e.g., for 100 ms) in the event of a power fail condition. The supercapacitor 191 may be sized such that the CPU 160 continues to operate to perform a cache flush to save cached data to the NVDIMM 180 and to allow the NVDIMM 180 to complete an ADR before the computer system 100 completely powers down due to the power fail condition.

In one embodiment, the MTRR 120 for memory locations in the NVDIMM 180 is set for write-back cache strategy. This way, an MTRR 120 for a range of memory locations that includes memory locations in the NVDIMM 180 and in the RDIMM 170 may be set for write-back cache strategy, thereby reducing the number of MTRRs 120 that is consumed and making the MTTRs 120 more organized and streamlined. When a power fail condition is detected (see arrow 151), the power supply 190 triggers a hardware NMI (see arrow 152) to initiate saving critical data to the non-volatile memory locations 103 in the NVDIMM 180. The supercapacitor 191 provides enough power (see arrow 153) to sustain operations for a sufficient amount of time (e.g., 100 ms) to allow cached data in the cache memory locations 110 of the CPU 160 to be saved to the non-volatile memory locations 103 of the NVDIMM 180 before the computer system 100 completely powers down.

In response to receiving the hardware NMI (see arrow 152), the CPU 160 initiates a cache flush (see arrow 154) to save cache data from the cache memory locations 110 to corresponding memory locations 102 in the NVDIMM 180. Thereafter, the CPU 160 (or another component) may initiate an ADR to save the now synchronized data in the volatile memory locations 102 to the non-volatile memory locations 103 in the NVDIMM 180 (see arrow 155). Cached data in the cache memory locations 110 are thus saved to the non-volatile memory locations 103 in the NVDIMM 180 in the event of a power failure, even when the MTTRs 120 are set to write-back cache strategy for memory locations 102 in the NVDIMM 180.

Figure 2:
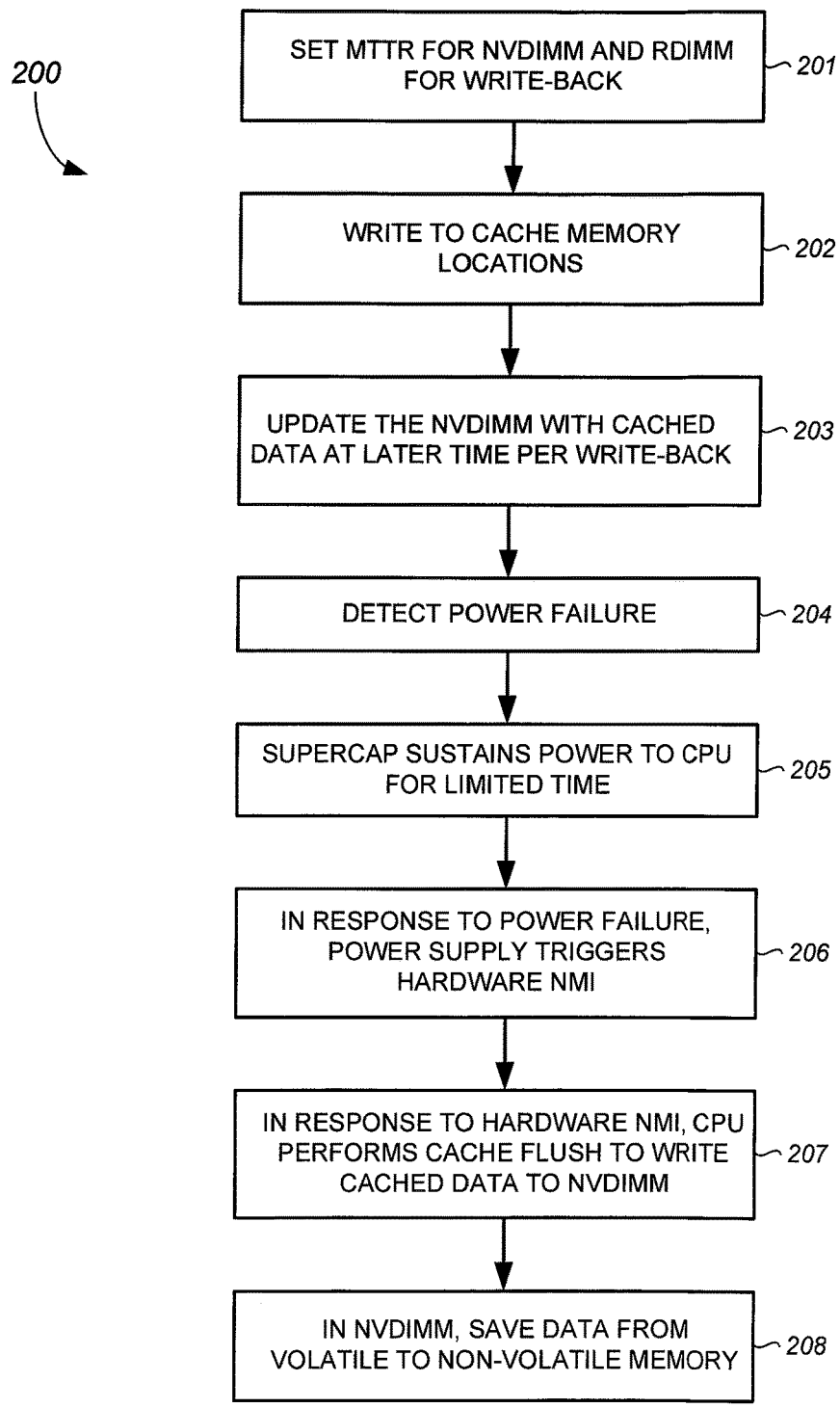
FIG. 2 is a flow diagram of a computer-implemented method of setting cache strategies of memory locations in accordance with an embodiment of the present invention.

FIG. 2 is a flow diagram of a computer-implemented method 200 of setting cache strategies of memory locations in accordance with an embodiment of the present invention. The method 200 is explained with reference to previously disclosed components for illustration purposes only. As can be appreciated, other components may also be employed without detracting from the merits of the present invention.

In the example of FIG. 2, the MTRR 120 of the CPU 160 is set for write-back cache strategy for a range of memory locations in the NVDIMM 180 and memory locations in the RDIMM 170 (step 201). The MTRR 120 may be set by the operating system, firmware, or other component of the computer system 100. Accordingly, when data are written to cache memory locations 110 that cache data for the memory locations 102 in the NVDIMM 180 (step 202), the memory locations 102 are not updated with the data at the same time the data are cached in the memory locations 110. Instead, the memory locations 102 in the NVDIMM 180 are updated with the cached data at a later time per the write-back cache strategy (step 203). Thereafter, the power supply 190 detects a power failure (step 204). The power failure may be due to inadvertent removal of the AC power cord, brown out, etc. The supercapacitor 191 of the power supply 190 provides power to the CPU 160 for a limited time during the power failure (step 205), with the limited time being long enough to allow cached data in the cache memory locations 110 of the CPU 160 to be saved to the non-volatile memory locations 103 in the NVDIMM 180 before the computer system 100 completely powers down.

In response to detecting the power failure, the power supply 190 triggers a hardware NMI (step 206). The CPU 160, in response to the hardware NMI, performs a cache flush to write cached data in the cache memory locations 110 to corresponding volatile memory locations 102 in the NVDIMM 180 (step 207). In the NVDIMM 180, the data in the volatile memory locations 102 are saved to the non-volatile memory locations 103 (step 208). The save to the non-volatile memory locations 103 may be by ADR initiated by the CPU 160 after the cache flush, in response to detecting the power failure.

Systems and methods for configuring memory type range registers have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer system comprising:
   a dual in-line memory module (DIMM);
   a non-volatile dual in-line memory module (NVDIMM);
   a central processing unit (CPU) with internal cache memory locations for storing cached data and an internal memory type range register (MTRR) that indicates a cache strategy for caching data for a range of memory locations, the MTTR being configured for write-back cache strategy for the range of memory locations that includes memory locations in the DIMM and memory locations in the NVDIMM; and
   a power supply that is configured to trigger a hardware non-maskable interrupt (NMI) in response to detecting a power failure and to provide power to the CPU during the power failure to allow the cached data in the internal cache memory locations of the CPU to be saved to non-volatile memory locations in the NVDIMM before the computer system completely powers down due to the power failure,
   wherein, before power to the CPU is completely gone due to the power failure, the cached data are flushed from the internal cache memory locations of the CPU to corresponding volatile memory locations in the NVDIMM that are included in the range of memory locations for write-back cache strategy as set in the MTTR, and the cached data are saved from the volatile memory locations in the NVDIMM to the non-volatile memory locations that are also in the NVDIMM.

2. The computer system of claim 1, wherein the power supply is configured to trigger the hardware NMI by asserting a line on a bus of the computer system.

3. The computer system of claim 1, wherein the power supply comprises a supercapacitor that is configured to provide the power to the CPU after detection of the power failure but before the computer system completely powers down due to the power failure.

4. The computer system of claim 1, wherein the DIMM is a registered DIMM (RDIMM).

5. A computer-implemented method of setting a cached strategy of memory locations of a computer system, the method comprising:
    setting a memory type range register (MTTR) for a range of memory locations for write-back cache strategy, the range of memory locations including memory locations in a non-volatile dual in-line memory module (NVDIMM) and memory locations in a dual in-line memory module (DIMM);
    detecting a power failure;
    triggering a hardware non-maskable interrupt (NMI) in response to detecting the power failure;
    in response to the hardware NMI, performing a cache flush to write cached data from internal cache memory locations of a central processing unit (CPU) to volatile memory locations in the NVDIMM that are included in the range of memory locations for write-back cache strategy as set in the MTTR; and
    before power to the CPU is completely gone because of the power failure, saving the cached data from the volatile memory locations in the NVDIMM to non-volatile memory locations that are also in the NVDIMM.

6. The method of claim 5, wherein saving the cached data from the volatile memory locations in the NVDIMM to the non-volatile memory locations that are also in the NVDIMM comprises:
    performing an asynchronous dynamic random access memory refresh.

7. The method of claim 5, further comprising:
    sustaining, by a supercapacitor, power to the CPU.

8. The method of claim 5, wherein the hardware NMI is triggered by a power supply in response to detecting the power failure.

* * * * *